3,051,621
GEL COMPOSITION, PRESSURIZED CONTAINER WITH SAME, AND METHOD OF PREPARATION
Daniel M. Green, University City, Kenneth Joseph Kohnle, Warson Woods, and Robert Joseph Elliott, Manchester, Mo., assignors to Grove Laboratories Incorporated, St. Louis, Mo., a corporation of Delaware
No Drawing. Filed Oct. 22, 1959, Ser. No. 847,913
5 Claims. (Cl. 167—65)

This invention relates to gelled analgesic compositions. More specifically this invention relates to analgesic gels containing a therapeutic quantity of magnesium salicylate [$Mg(C_7H_5O_3)_2 \cdot 4H_2O$] which can be dispensed from pressurized containers.

Unit dosages for oral administration of the various analgesic salicylates such as acetylsalicylic acid and calcium salicylate are usually administered in the form of tablets, capsules or syrups. Tablets and capsules are relatively slow acting since they have to disintegrate and the active components solubilize in the stomach before being absorbed by the body. The syrups are messy and difficult to dispense without spillage in a convenient unit dosage form such as a teaspoon. Also, the syrups contain emulsions or suspensions of analgesics which are relatively unstable and tend to separate out in the container. Gels containing a therapeutic quantity of an analgesic are not in use since most of the analgesics do not have sufficient solubility in a gel so that a therapeutically effective quantity of the analgesic, i.e., about 5 grains (325 mg.) can be dispensed in one teaspoonful, i.e., 5 milliliters. Also, many of the salicylates which have a high solubility in water, such as those of the alkali metals, produce deleterious side effects in the body such as nausea. By the term gel we mean the solid phase of a colloidal solution, as opposed to sol, the liquid phase. A gel consists of a colloidal solution of a liquid in a solid and specifically in the present invention the gel compries a gelling agent and a solution of magnesium salicylate in water.

The primary object of this invention is to produce an analgesic composition which is in gelled form; which contains an analgesic agent having a high solubility in the gel; which does not produce deleterious side effects upon oral administration; which is rapidly absorbed by the stomach and which is stable. A further object is to produce a gelled analgesic with the above described advantageous properties which can be dispensed from a pressurized container. Additional objects appear in the specification.

It has now been found that magnesium salicylate has a high initial blood level when administered orally; quantities sufficient for analgesic use, e.g., from over 200 mg. to about 600 mg. can be dispensed as a gel in one conventional teaspoonful; the magnesium salicylate does not produce deleterious side effects and it is one of the few analgesics which is soluble over a wide pH range such as a pH of about 4 to about 7. The pH stability also permits the magnesium salicylate to be compounded with materials having a wide pH range without precipitating the magnesium salicylate in the gel. The gelled analgesic is more easily assimilated by the body than a tablet and it is easier to measure a convenient dosage of the gel than the use of a syrup. The gel can be dispensed from pressurized containers by the use of a non-toxic gas such as nitrogen, argon, helium, carbon dioxide, nitrous oxide, etc.

The use of magnesium salicylate affords a number of advantages not possessed by closely related salicylates such as calcium salicylate. No more than 200 milligrams of calcium salicylate per 5 milliliters of gel at 25° C. can be used in the gelled form, since greater quantities separate out of the gel. This quantity, i.e., 200 mg. is only about 3.0 grains $$\left(\frac{200}{64.8}=\text{about }3.0\right)$$

and is below the quantity required for a therapeutic dosage. Quantities of calcium salicylate which are greater than 200 mg. per 5 milliliters at 25° C. separate out of the gel whereas the solubility of magnesium salicylate is in excess of 600 mg. per 5 milliliters of the gel at 25° C.

The analgesic gels of this invention are produced by admixing and agitating magnesium salicylate and the gelling agent with hot water (about 90° C. to 100° C.), after which time the hot liquid is allowed to cool to room temperature. Optionally, additives such as buffers, flavors, coloring agents, sweetening agents and additional medicaments such as vasconstrictors, expectorants, antitussive agents, vitamins, antibiotics, and antihistamines can be added to the gel. The gel can contain up to about 900 grams of additives per liter and preferably up to about 400 grams of additives per liter of the gel. In all instances each liter of the gel contains a total of at least 500 ml. of water and preferably at least 910 ml. of water.

The quantity of the magnesium salicylate in the gel can vary from about 200 and preferably over 200 mg. to about 600 mg. per teaspoon (i.e., 5 ml.). This value when converted to a liter measurement is about 40 grams to about 120 grams per liter of gel. Preferably from about 260 mg. (4 grains) to about 390 mg. (6 grains) of the magnesium salicylate per teaspoon are employed, i.e., about 52 grams to about 78 grams per liter of gel.

Illustrative of the gelling agents there can be mentioned pectin, gelatin, the propylene glycol ester of alginic acid, polyvinylpyrollidone, carboxymethylcellulose and vegetable gums. However, the particular gelling agent employed is not critical and any non-toxic gelling agent can be used. The viscosity of the analgesic gel can vary from about 1950 cps. to about 200,000 cps. at 25° C. and preferably above 100,000 cps. at 25° C. The gel has sufficient cohesion to itself and a sufficient adhesion to a conventional metal teaspoon so that it will not fall out of the spoon when the spoon is inverted. The quantity of gelling agent can range from about 1.0% to about 10.0% by weight based on the entire composition, and preferably from about 1.5% to about 3% by weight of the entire composition although any quantity which gives the desired viscosity is suitable.

In a preferred form of the invention the analgesic gel is dispensed from a pressurized container. The propellant employed is a non-toxic gas such as nitrogen, argon, helium, neon, carbon dioxide, nitrous oxide, etc. The relatively inert non-toxic gases such as nitrogen or neon are preferred. Such gases do not liquify at room temperature (25° C.) and pressures of 20 to 100 p.s.i.g. in contradistinction to the conventional haloalkane propellants. Haloalkanes which are liquified at pressures of 20 to 100 p.s.i.g. at room temperature are not desirable in this invention since they produce excess foaming of the gelled analgesic. The pressures employed in the containers can vary from about 20 to 100 p.s.i.g. and preferably from about 50 to 90 p.s.i.g. The pressurized containers are charged by conventional methods such as by first placing the gelled analgesic in a conventional aerosol can, leaving about 20% to 30% by volume of headspace in the can, crimping on a valve to seal the container, evacuating the air and thereafter injecting through the valve and into the container the required pressure, e.g., 20–100 p.s.i.g., from a gassing head. Preferably, a dip tube is employed in the valve assembly, or optionally, the container can be inverted for dispensing the gel. The gels can also be dispensed from collapsible tubes although the use of pressurized dispensers is preferred.

EXAMPLE 1

A 3 liter quantity of a magnesium salicylate analgesic gel was prepared. The gel had the following composition:

| | |
|---|---:|
| Magnesium salicylate_____gm__ | 180 |
| Ammonium chloride_____gm__ | 30 |
| Phenylephrine hydrochloride_____gm__ | 3.0 |
| Sodium citrate_____gm__ | 81 |
| Sucrose _____gm__ | 1125 |
| (70% aqueous solution of crystalline D-sorbitol) _____gm__ | 1125 |
| Sodium cyclamate_____gm__ | 10.5 |
| Sodium saccharin_____gm__ | 1.5 |
| (Propylene glycol ester of alginic acid) (Kelcoloid HV) [1]_____gm__ | 45 |
| Methyl paraben_____gm__ | 3.75 |
| Propyl paraben_____gm__ | 0.75 |
| Menthol crystals_____gm__ | 0.45 |
| Ethyl alcohol (95%)_____ml__ | 15.78 |
| F.D. and C. Red No. 2_____gm__ | 0.6 |
| Cherry flavor_____ml__ | 12.0 |
| Water, distilled, q.s. 3000 ml. | |

[1] Manufactured by the Kelco Co.

The gel of Example 1 was made up as follows: The sodium cyclamate and sodium saccharin were dissolved in 750 ml. of water. Then the sucrose was added, mixed and brought to a boil. Then the following were immediately added in this order: methyl paraben, propyl paraben, sorbitol, sodium citrate, ammonium chloride, phenylephrine hydrochloride, magnesium salicylate (predissolved in about 300 ml. of water), menthol crystals (predissolved in the ethyl alcohol), dye (predissolved in 80 ml. of water), flavor and the propylene glycol ester of alginic acid. Water (about 200 ml.) was then added to make up to 3000 ml. of gel. The gel had a viscosity of 1950 cps. at 25° C. and a pH at 25° C. of 4.80. A pressurized unit of this gel can be produced by placing a sufficient quantity of the gel in a conventional aerosol container, such as a 6 oz. aerosol can, so as to fill about 70% by volume of the can crimping on a valve to seal the container, evacuating the air and thereafter injecting through the valve and into the container about 55 p.s.i.g. of nitrogen.

EXAMPLE 2

A magnesium salicylate analgesic gel was produced which had the following composition (the quantities shown are in milligrams except for the water, alcohol and flavoring agent which are in milliliters):

| | |
|---|---:|
| Magnesium salicylate_____ | 300.0 |
| Phenylephrine hydrochloride_____ | 5.0 |
| Ammonium chloride_____ | 50.0 |
| Sodium citrate_____ | 135.0 |
| Sucrose _____ | 1875.0 |
| Sorbitol (70% aqueous solution)_____ | 1875.0 |
| Sodium cyclamate_____ | 17.0 |
| Sodium saccharin_____ | 2.5 |
| Propylene glycol ester of alginic acid_____ | 75.0 |
| Methyl paraben_____ | 6.25 |
| Propyl paraben_____ | 1.25 |
| Menthol crystals_____ | 0.75 |
| Ethyl alcohol_____ml__ | 0.025 |
| F. D. and C. Red No. 2_____ | 1.0 |
| Cherry flavor_____ml__ | 0.02 |
| Water, distilled, q.s. to make up 5 ml. (about 2.5 ml. of water was added). | |

The composition of Example 2 was prepared in the same manner as that of Example 1. A comparison of plasma salicylate levels was made on rabbits after oral administration of the above magnesium salicylate gel and aspirin tablets containing the conventional binding and disintegrating agents. The dose employed for both the gel and the conventional tablets was 10 mg. in terms of the salicylate radical per kilogram weight of the animal. The percent of salicylate in magnesium salicylate is 74% as compared with a salicylate content of 76.1% in acetylsalicylic acid. Table 1 shows the results obtained. All values were corrected for variations in level at zero time.

Table 1

| Rabbit No. | Magnesium salicylate gel, time (minutes) | | | Aspirin tablets, time (minutes) | | |
|---|---|---|---|---|---|---|
| | 10 | 20 | 30 | 10 | 20 | 30 |
| 1 | 34.00 | 35.28 | 35.28 | 3.82 | 5.52 | 12.75 |
| 2 | 27.62 | 32.30 | 33.15 | 0 | 0.42 | 0.42 |
| 3 | 44.20 | 43.35 | 39.95 | 0 | 0 | 1.70 |
| 4 | 20.40 | 24.63 | 25.08 | 0 | 0 | 0 |
| 5 | 28.90 | 31.45 | 32.30 | 1.27 | 1.27 | 3.82 |
| 6 | 25.50 | 34.85 | 34.00 | 0.42 | 0.42 | 2.12 |
| 7 | 36.55 | 38.25 | 37.40 | 0 | 0.85 | 0 |
| 8 | 35.70 | 41.22 | 39.52 | 2.97 | 6.80 | 9.77 |
| 9 | 39.95 | 45.05 | 43.78 | 2.12 | 5.10 | 7.65 |
| 10 | 25.50 | 34.85 | 39.10 | 1.28 | 1.70 | 2.13 |
| 11 | 48.45 | 49.30 | 45.05 | 5.95 | 9.35 | 14.87 |
| 12 | 49.72 | 45.47 | 36.55 | 0.43 | 0.85 | 1.70 |
| 13 | 36.55 | 40.73 | 39.95 | 3.40 | 13.18 | 25.50 |
| 14 | 30.18 | 34.43 | 37.40 | 4.68 | 8.93 | 14.03 |
| 15 | 9.78 | 34.85 | 38.68 | 0.85 | 2.98 | 5.95 |
| 16 | 40.37 | 40.80 | 38.67 | | | |
| Total | 533.37 | 606.81 | 595.86 | 27.19 | 57.37 | 102.41 |
| Average | 33.34 | 37.93 | 37.24 | 1.81 | 3.82 | 6.83 |

It can be seen from Table 1 that the magnesium salicylate was absorbed by the animal in much greater quantities than the aspirin.

EXAMPLE 3

This example shows comparative blood salicylate levels in humans with the gel of Example 2 as compared to aspirin tablets such as those used in Example 2.

Procedure: Each human blood salicylate investigation was performed on subjects who were of good health, of the same sex, and of the same age range. Latin square experimental design was used for trials, thus resulting in a controlled cross-over of preparations in the subjects. On each of the study days, no food was taken by the subjects from the previous midnight until the completion of the study. For 48 hours prior to the study, no salicylate-containing preparations were taken. Prior to administration of each medication an initial or zero hour venous blood sample was obtained as a control. After oral administration of two tablets of the test preparation and one glass of water, samples were then obtained at three intervals; 10, 20 and 30 minutes. Following withdrawal of blood, the needle was removed from the syringe and the blood gently transferred to a screw-capped tube containing heparin (100 units per milliliter) as the anticoagulant. The blood was not agitated or mixed, and was refrigerated as soon as possible. Blood plasma from each sample was analyzed for its salicylate content by a standard photometric procedure.

A comparison of plasma salicylate levels was measured in human subjects after oral administration of a magnesium salicylate gel formulation of Example 2, and the aspirin tablets of Example 2.

Dose: 10 ml. of the gel (2 teaspoonfuls) containing a total of 600 mg. of magnesium salicylate; 8 tablets containing 10 grains (approximately 650 mg.) of aspirin. All values were corrected for variations in level at zero time. The results are shown in Table 2.

*Table 2*

| Subject No. | Magnesium salicylate gel, time (minutes) | | | Aspirin tablets, time (minutes) | | |
|---|---|---|---|---|---|---|
| | 10 | 20 | 30 | 10 | 20 | 30 |
| 1 | 54.65 | 47.93 | 46.14 | 11.64 | 20.61 | 24.64 |
| 2 | 47.93 | 52.41 | 52.41 | 19.71 | 33.60 | 34.94 |
| 3 | 25.53 | 45.24 | 55.10 | 8.96 | 26.88 | 38.98 |
| 4 | 21.06 | 42.56 | 42.06 | 2.69 | 10.75 | 17.02 |
| 5 | 30.02 | 46.59 | 56.00 | 12.09 | 35.84 | 40.32 |
| 6 | 12.10 | 30.02 | 42.12 | 1.79 | 15.68 | 20.16 |
| 7 | 13.44 | 19.26 | 28.22 | 10.75 | 19.26 | 21.50 |
| 8 | 36.73 | 64.51 | 61.82 | 19.71 | 34.49 | 42.11 |
| 9 | 31.81 | 44.80 | 39.42 | 6.27 | 15.23 | 19.26 |
| 10 | 38.53 | 52.41 | 52.86 | 1.34 | 3.13 | 7.61 |
| 11 | 28.22 | 52.86 | 51.07 | 8.96 | 25.54 | 29.57 |
| 12 | 26.43 | 49.73 | 49.28 | 7.61 | 21.05 | 25.98 |
| Total | 366.45 | 548.32 | 576.50 | 111.52 | 262.06 | 322.09 |
| Average | 30.54 | 45.69 | 48.04 | 9.29 | 21.84 | 26.84 |

It can be seen that the magnesium salicylate gel was absorbed by the human system in much greater quantities than the aspirin from the tablets.

What is claimed is:

1. A pressurized unit containing an analgesic gel and a non-toxic gaseous propellant, said analgesic gel having a viscosity of about 1950 cps. to about 200,000 cps. at 25° C. and comprising per liter of gel from about 40 grams to about 120 grams of magnesium salicylate, from about 10 to 100 grams of a gelling agent, and at least 500 milliliters of water, said propellant being under a pressure of about 20 to 100 p.s.i.g., said pressurized unit being substantially free of liquified propellant.

2. A pressurized unit containing an analgesic gel and a non-toxic gaseous propellant, said analgesic gel having a viscosity of about 1950 cps. to about 200,000 cps. at 25° C. and comprising per liter of gel from about 40 grams to about 120 grams of magnesium salicylate, from about 10 to 100 grams of the propylene glycol ester of alginic acid as a gelling agent, and at least 500 milliliters of water, said propellant being under a pressure of about 20 to 100 p.s.i.g., said pressurized unit being substantially free of liquified propellant.

3. A pressurized unit containing an analgesic gel and a non-toxic gaseous propellant, said analgesic gel having a viscosity of about 100,000 cps. to about 200,000 cps. at 25° C. and comprising per liter of gel from about 52 to 78 grams of magnesium salicylate, from about 15 to 30 grams of a gelling agent, and at least 910 milliliters of water, said propellant being under a pressure of about 50 to 90 p.s.i.g., said pressurized unit being substantially free of liquified propellant.

4. The pressurized unit of claim 3 wherein the propellant is nitrogen.

5. An analgesic gel composition having a viscosity of about 1950 cps. to about 200,000 cps. at 25° C. and comprising, per liter of gel, from about 40 grams to about 120 grams of magnesium salicylate, from about 10 to about 100 grams of a gelling agent and at least 500 milliliters of water.

References Cited in the file of this patent

UNITED STATES PATENTS

| 2,782,975 | Boid | Feb. 26, 1957 |
| 2,868,691 | Porush et al. | Jan. 13, 1959 |
| 2,877,269 | Van Campen et al. | Mar. 10, 1959 |
| 2,889,249 | Beiler et al. | June 2, 1959 |
| 2,914,564 | Allen et al. | Nov. 24, 1959 |
| 2,948,731 | Stevens | Aug. 9, 1960 |

OTHER REFERENCES

Gross et al.: "The Salicylates," Hillhouse Press, New Haven, 1948, page 14.